(12) United States Patent
Haldner et al.

(10) Patent No.: US 9,398,224 B2
(45) Date of Patent: Jul. 19, 2016

(54) METHOD AND DEVICE FOR DETECTING AN OBJECT IN A SUBSTRATE

(75) Inventors: Patrick Haldner, Schaan (LI);
Christoph Wuersch, Werdenberg (CH);
Wilfried Kaneider, Rankweil (AT);
Dietmar Schoenbeck, Goefis (AT);
Sascha Korl, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 672 days.

(21) Appl. No.: 13/549,055

(22) Filed: Jul. 13, 2012

(65) Prior Publication Data

US 2013/0182167 A1 Jul. 18, 2013

(30) Foreign Application Priority Data

Jul. 15, 2011 (DE) .......................... 10 2011 079 258

(51) Int. Cl.
*G01R 19/00* (2006.01)
*G01R 29/12* (2006.01)
*H04N 5/232* (2006.01)
*G01V 3/165* (2006.01)

(52) U.S. Cl.
CPC ............ *H04N 5/23296* (2013.01); *G01V 3/165* (2013.01)

(58) Field of Classification Search
CPC ........... G01V 3/165; G01V 3/08; G01V 3/10; G01R 19/00; G01R 29/12; G01S 13/74; H04N 5/23296
USPC ........................ 324/67, 326, 458, 329; 342/22
See application file for complete search history.

(56) References Cited

U.S. PATENT DOCUMENTS

| | | | | |
|---|---|---|---|---|
| 4,099,118 A | * | 7/1978 | Franklin ................ | G01V 3/088 200/600 |
| 4,220,913 A | * | 9/1980 | Howell .................... | G01V 3/06 324/326 |
| 4,263,552 A | * | 4/1981 | Weber ...................... | G01V 3/15 324/326 |
| 4,390,836 A | * | 6/1983 | Bruce ...................... | G01V 3/06 324/326 |
| 4,868,910 A | * | 9/1989 | Maulding ............... | G01V 3/107 324/233 |
| 4,896,116 A | * | 1/1990 | Nagashima ............. | G01S 7/412 324/329 |
| 4,951,055 A | * | 8/1990 | Katayama ............... | G01S 7/295 324/326 |
| 4,992,741 A | * | 2/1991 | Douglas ................. | G01V 3/088 324/67 |
| 4,994,747 A | * | 2/1991 | Stolarczyk ..................... | 324/334 |
| 5,001,430 A | * | 3/1991 | Peterman ............... | G01V 3/105 324/326 |
| 5,093,622 A | * | 3/1992 | Balkman ....................... | 324/326 |
| 5,512,834 A | * | 4/1996 | McEwan ....................... | 324/642 |

(Continued)

FOREIGN PATENT DOCUMENTS

| | | |
|---|---|---|
| DE | 102 05 002 A1 | 8/2003 |
| DE | 10 2004 007 315 A1 | 8/2005 |
| GB | 2453199 * | 4/2009 |

OTHER PUBLICATIONS

German Search Report dated Jun. 5, 2012 (Two (2) pages).

*Primary Examiner* — Jay Patidar
*Assistant Examiner* — Lamarr Brown
(74) *Attorney, Agent, or Firm* — Crowell & Moring LLP (57) ABSTRACT

A method and device for detecting an object in a substrate is disclosed. The device has a sensor unit having a sensor element and at least one further sensor element, a control and evaluation unit, and a display unit. The method for detecting an object in a substrate includes simultaneous reception of a receive signal and at least one further receive signal and simultaneous calculation of a depth cross-sectional image from the receive signal and at least one further depth cross-sectional image from the at least one further receive signal by the control and evaluation unit.

18 Claims, 9 Drawing Sheets

(56) References Cited

U.S. PATENT DOCUMENTS

| | | | | |
|---|---|---|---|---|
| 5,557,206 A | * | 9/1996 | Won | G01V 3/107 324/262 |
| 6,026,135 A | * | 2/2000 | McFee | C09D 11/00 250/392 |
| 6,246,355 B1 | * | 6/2001 | Miceli | G01S 7/412 342/175 |
| 6,335,624 B1 | * | 1/2002 | Berthier et al. | 324/326 |
| 6,415,666 B1 | * | 7/2002 | Donskoy | F41H 11/12 367/87 |
| 6,501,414 B2 | * | 12/2002 | Arndt | F41H 11/12 342/194 |
| 6,667,709 B1 | * | 12/2003 | Hansen | G01S 13/86 324/326 |
| 6,670,906 B1 | * | 12/2003 | Roberts | G01S 5/0284 342/22 |
| 6,911,823 B2 | * | 6/2005 | Rowan | G01V 3/104 324/326 |
| 6,999,021 B2 | * | 2/2006 | Taylor, Jr. | G01V 3/15 342/191 |
| 7,145,319 B2 | * | 12/2006 | Dunning | 324/66 |
| 7,164,270 B1 | * | 1/2007 | Chen et al. | 324/326 |
| 7,741,848 B1 | * | 6/2010 | Olsson | G01V 3/15 324/326 |
| 7,956,794 B2 | * | 6/2011 | Skultety-Betz | G01S 7/032 324/323 |
| 7,973,704 B2 | * | 7/2011 | Storz | G01S 7/24 342/118 |
| 7,990,151 B2 | * | 8/2011 | Olsson | G01V 3/15 324/326 |
| 7,999,550 B2 | * | 8/2011 | Morrison | G01V 3/104 324/326 |
| 8,604,969 B2 | * | 12/2013 | Wood | G01S 7/12 342/191 |
| 8,981,781 B2 | | 3/2015 | Haldner et al. | |
| 2002/0075001 A1 | * | 6/2002 | Goodman | G01V 3/15 324/326 |
| 2003/0193429 A1 | * | 10/2003 | Campana | G01S 13/86 342/22 |
| 2004/0197096 A1 | * | 10/2004 | Hofer | H04N 5/23212 396/121 |
| 2005/0110496 A1 | * | 5/2005 | Siegel et al. | 324/329 |
| 2007/0007965 A1 | * | 1/2007 | Williams | G01V 11/00 324/326 |
| 2008/0036644 A1 | | 2/2008 | Skultety-Betz et al. | |
| 2008/0297158 A1 | * | 12/2008 | Heger | G01V 3/107 324/326 |
| 2009/0284405 A1 | | 11/2009 | Salmon et al. | |
| 2010/0001714 A1 | * | 1/2010 | Royle | G01V 3/08 324/67 |
| 2010/0001731 A1 | * | 1/2010 | Royle et al. | 324/326 |
| 2010/0001732 A1 | * | 1/2010 | Royle | G01V 3/08 324/326 |
| 2011/0304314 A1 | * | 12/2011 | Krapf | 324/67 |
| 2012/0229321 A1 | * | 9/2012 | Holly et al. | 342/22 |
| 2013/0314512 A1 | * | 11/2013 | Watanabe | H04N 13/0402 348/51 |
| 2015/0145518 A1 | | 5/2015 | Haldner et al. | |

* cited by examiner

METHOD AND DEVICE FOR DETECTING AN OBJECT IN A SUBSTRATE

This application claims the priority of German Patent Document No. DE 10 2011 079 258.9, filed Jul. 15, 2011, the disclosure of which is expressly incorporated by reference herein.

BACKGROUND AND SUMMARY OF THE INVENTION

The invention relates to a method for detecting an object in a substrate as well as a device for detecting an object in a substrate Typical objects that are detected in substrates are water pipes, reinforcing bars, electrical lines, power lines, accumulations of moisture and cavities. Within the scope of this patent application the term "object" includes any fixed, liquid and gaseous objects that are embedded in substrates. Because of the risk of injury associated with severing a power line, a detecting device must detect a power line with a high degree of reliability. A power line is a current-carrying electrical line which generates a magnetic field during operation that can be used to detect the power line. Even though telephone and antenna cables constitute electrical lines, they carry only very little current and do not fall under the definition of the term "power line" as used in the scope of this patent application.

German Patent Document No. DE 102 05 002 A1 discloses a method and a device for detecting an object in a substrate. The detecting device includes a sensor unit, a control and evaluation unit and a display unit. The control and evaluation unit is connected to the sensor unit and the display unit via a first and second real-time communication connection. In this case, along with communication connections without a time delay, the term "real-time communication connection" also includes communication connections in which the time delay between acquisition of the receive signals by the sensor unit and display of a depth cross-sectional image on the display unit is so short that the depth cross-sectional image on the display unit is essentially reproducing a depth cross-sectional image through the substrate at the current position of the sensor unit.

The detecting device is guided over the surface of the substrate in parallel, linear measuring tracks. The receive signals acquired by the sensor unit are transmitted by the first real-time communication connection to the control and evaluation unit while other sectional lines are being scanned and the control and evaluation unit calculates a depth cross-sectional image of the substrate. The depth cross-sectional image is transmitted by the control and evaluation unit to the display unit via the second real-time communication connection while other sectional lines are being scanned, and the display unit displays the depth cross-sectional image through the substrate on the display unit. In order to improve clarity and spatial orientation for the operator, the depth cross-sectional image includes, among other things, a depth scale and graphic pattern for displaying the objects.

The disadvantage is that the detecting device has to be guided over the surface of the substrate in several parallel measuring tracks in order to acquire a specific surface of the substrate. The depth cross-sectional images of the individual measuring tracks are displayed on the display unit virtually in real time, but the depth cross-sectional images of the parallel measuring tracks are not displayed at the same time so that the operator does not have any spatial orientation about where the objects are located in the substrate.

In contrast, the object of the present invention consists of further developing a method and a device for detecting an object in a substrate to the effect that the operator obtains spatial orientation of where the objects are located in the substrate. In addition, the operator's effort during detection is reduced.

The method for detecting an object in a substrate is characterized according to the invention by the further steps of simultaneous reception of at least one further receive signal by a further sensor element of the sensor unit and simultaneous calculation of at least one further depth cross-sectional image from the at least one further receive signal by the control and evaluation unit. Because a further receive signal is received at the same time as the receive signal, it is possible for the control and evaluation unit to calculate at least one further depth cross-sectional image. During a feed movement of the detecting device over the substrate, several depth cross-sectional images are calculated and displayed on the display unit so that the operator's effort during detection is reduced.

A plan view is preferably calculated from the depth cross-sectional images and displayed on the display unit, wherein the plan view is calculated as the mean value, median, maximum value or weighted sum over a depth range between a first depth and a second depth. From the plan view, the operator obtains a direct spatial impression of where the objects are located in the substrate. It is especially preferred that the first and second depths are adjustable so that the operator is able to restrict the objects displayed in the plan view to specific depth ranges.

It is especially preferred that only objects that exceed a threshold value are depicted in the plan view, wherein the threshold value is preferably adjustable. The adjustability of the threshold value makes it possible for the operator to adapt the depiction of the plan view to his/her requirements. It is possible to eliminate artifacts and interference via the threshold value so that only the objects that the operator would like to display are displayed in the plan view.

It is especially preferred that the depth cross-sectional images are interpolated. Due to the interpolation of the depth cross-sectional images, it is possible to increase the resolution of the objects in the plan view. The interpolation is suitable for example for guided detecting devices, which are moved over the substrate in a linear feed movement. In a horizontal direction perpendicular to a feed direction, the resolution of the objects is essentially determined by the number of sensor elements, whereas a high level of scanning takes place in the feed direction, which produces a high resolution of the objects. Due to the interpolation of the depth cross-sectional images, it is possible to increase the resolution in the horizontal direction.

In a preferred embodiment, further receive signals are received by sensor elements of a further sensor unit. It is possible to increase the quality and reliability of the measurement by using several sensor units with different sensor properties for receiving receive signals of the objects. The term "sensor property" includes all properties of sensor units such as size, position, orientation, sensor type. Additional sensor properties are included in the case of radar sensors, such as polarization (linear, circular, parallel, perpendicular), bandwidth, frequency band, modulation type, and in the case of inductive sensors, additional properties such as amplitude, frequency range, excitation pattern, sensitivity, band width.

In a preferred method variant, the sensor unit is moved over the substrate in a first feed direction and a second feed direction in parallel measuring tracks, wherein several depth cross-sectional images are calculated from the receive signals in the first and second feed directions. In doing so, it is especially preferred that a common plan view is calculated from the depth cross-sectional images of the first and second feed directions and is displayed on the display unit. Because a common plan view is calculated from the depth cross-sectional images of the individual measuring tracks and displayed on the display unit, it is also possible to detect larger surface areas and display them in a common measurement image.

In a first variant, common depth cross-sectional images are calculated from the receive signals of the sensor unit and the receive signals of the further sensor unit by the control and evaluation unit and a common plan view is calculated from the common depth cross-sectional images. The advantage of common depth cross-sectional images and a common plan view is that all objects are displayed in one depiction. In addition, the reliability when detecting an object type is increased if the object type is detected in different ways.

In a second variant, separate depth cross-sectional images are calculated from the receive signals of the sensor unit and the receive signals of the additional sensor unit by the control and evaluation unit and separate plan views are calculated from the separate depth cross-sectional images. The advantage of separate depth cross-sectional images and a separate plan view is that it is possible to adapt the display and calculation parameters for the depth cross-sectional images and the plan view to the depth range and the objects being detected.

In the case of the device for detecting an object in a substrate, it is provided according to the invention that the sensor unit have at least one further sensor element and the control and evaluation unit be designed to calculate simultaneous depth cross-sectional images from the receive signals of the sensor elements. A sensor unit with several sensor elements makes it possible to simultaneously receive several receive signals and for parallel depth cross-sectional images to be calculated by the control and evaluation unit.

The control and evaluation unit is preferably designed to calculate a plan view from the depth cross-sectional images as the mean value, median, maximum value or weighted sum over a depth range between a first depth and a second depth and display it on the display unit, wherein the first depth and the second depth are especially preferably designed to be adjustable. In addition to the cited mathematical functions of mean value, median, maximum value or weighted sum, any appropriate mathematical function may be used to calculate the plan view. The plan view provides the operator with a direct spatial orientation of the objects to the substrate. Because of the adjustability of the first and second depths, it is possible for objects that are embedded in the substrate at different depths to be displayed separately from one another in the plan view. The operator is able to restrict the object displayed in the plan view to different depth ranges.

A horizontal surface area in which the plan view is displayed is preferably designed to be adjustable, wherein the surface area is separately adjustable in a first and second horizontal direction. The adjustability of the horizontal surface area makes it possible for the operator to restrict the plan view to the surface area that is of interest to him/her. Because the size of the display unit is limited, it is possible to adapt the scale of the plan view to the set horizontal surface area.

In a preferred embodiment, at least one depth cross-sectional image and the plan view are able to be displayed simultaneously on the display unit. In doing so, the depth cross-sectional image displayed on the display unit is especially preferably adjustable via a rocker switch, wherein the position of the rocker switch is displayed in the plan view. The operator is able to use the rocker switch to switch back and forth between the depth cross-sectional images. Because the position of the rocker switch is displayed in the plan view, the operator is aware of the location at which he/she is viewing the depth cross-sectional image.

In a preferred embodiment, a first sensor unit having first sensor elements and a second sensor unit having second sensor elements are provided, wherein the second sensor elements differ in at least one sensor property from the first sensor elements. By using different sensor types or using a sensor type with different sensor properties it is possible to reliably detect different objects or objects at different depths of the substrate. For example, inductive sensors in the form of coils with a small coil diameter reliably detect objects near the surface and close to each other (not much separation), whereas coils with a large coil diameter reliably detect objects that are far away from the surface. By combining small and large coils, objects that are close to the surface and those that are far away from the surface are detected reliably. Depending upon the field of application of the detecting device, all known sensor elements may be combined with one another.

It is especially preferred that the first sensor unit is designed to detect any desired object and the second sensor unit is designed to detect a power line. Because of the risk of injury associated with severing a power line, a detecting device must detect a power line with a high degree of reliability. Because of the second sensor unit, which is provided exclusively to detect power lines, the reliability of detecting a power line is increased. The first sensor unit makes it possible to determine for example the spatial arrangement of the objects in the substrate and the second sensor unit is used to determine which of the objects constitute power lines.

It is especially preferred that the measuring results of the first sensor unit can be displayed on the display unit in a first display mode, the measuring results of the second sensor unit in a second display mode and the measuring results of the first and second sensor units in a third display mode. In the case of detecting devices that have two different sensor units, the control and evaluation unit calculates common depth cross-sectional images and/or separate depth cross-sectional images. A common plan view is calculated from the common depth cross-sectional images and displayed on the display unit. The advantage of common depth cross-sectional images and a common plan view is that all objects are displayed in one depiction. Separate depth cross-sectional images and separate plan views calculated therefrom may be displayed on the display unit simultaneously or in succession.

Exemplary embodiments of the invention will be described in the following on the basis of the drawings. These drawings are not necessarily supposed to represent the exemplary embodiments to scale, rather the drawings are executed in a schematic and/or slightly distorted form when this is useful for explanatory purposes. Reference is made to the pertinent prior art with respect to additions to the teachings directly identifiable from the drawings. It must be borne in mind in this case that a wide range of modifications and changes related to the form and detail of an embodiment may be undertaken without deviating from the general idea of the invention. The features of the invention disclosed in the description, the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

DETAILED DESCRIPTION OF THE DRAWINGS

Figure 1:
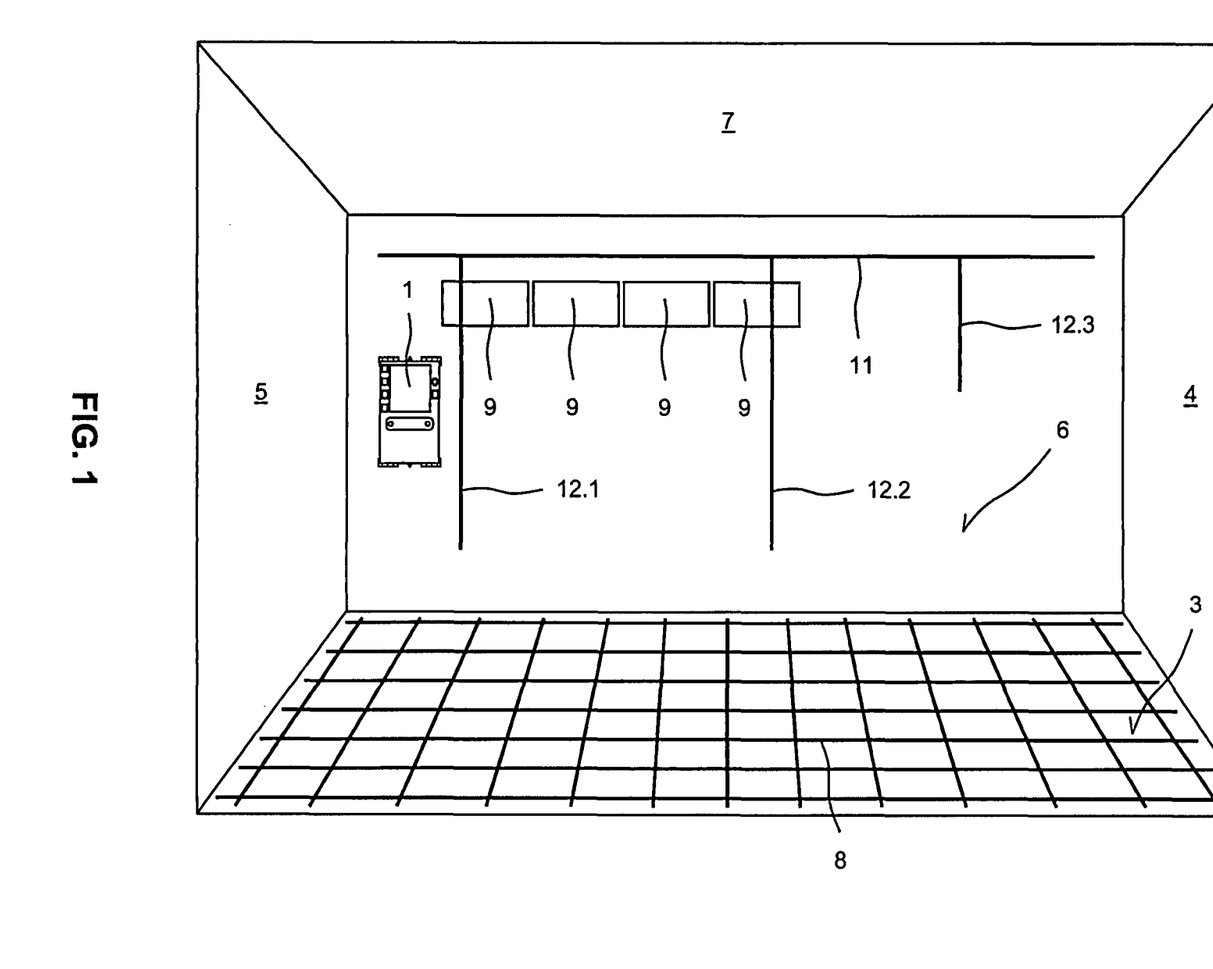
FIG. 1 illustrates the use of a detecting device according to the invention in an interior space, which has a concrete floor with an embedded iron grid and a masonry rear wall made of brick featuring power lines running horizontally and vertically.

FIG. 1 shows an application of a device 1 according to the invention for detecting an object in an interior space. The detecting device 1 is designed as a held or guided detecting device. A held detecting device is held over the substrate to be detected without a feed direction and a guided detecting device is guided over the substrate to be detected along a linear path or in any desired path. A detecting device that an operator holds or guides with his/her hand over the to-be-detected substrate is called hand-held or hand-operated.

The interior space is made of a floor 3, a right and left side wall 4, 5, a rear wall 6 and a ceiling 7. The floor 3 is made of a concrete surface with an embedded iron grid 8. The rear wall 6 is constructed of masonry or bricks 9. A horizontally arranged power line 11 and three vertically arranged power lines 12.1, 12.2, 12.3, which branch off from the horizontally arranged power line 11, run through the rear wall 7.

Figure 2A:
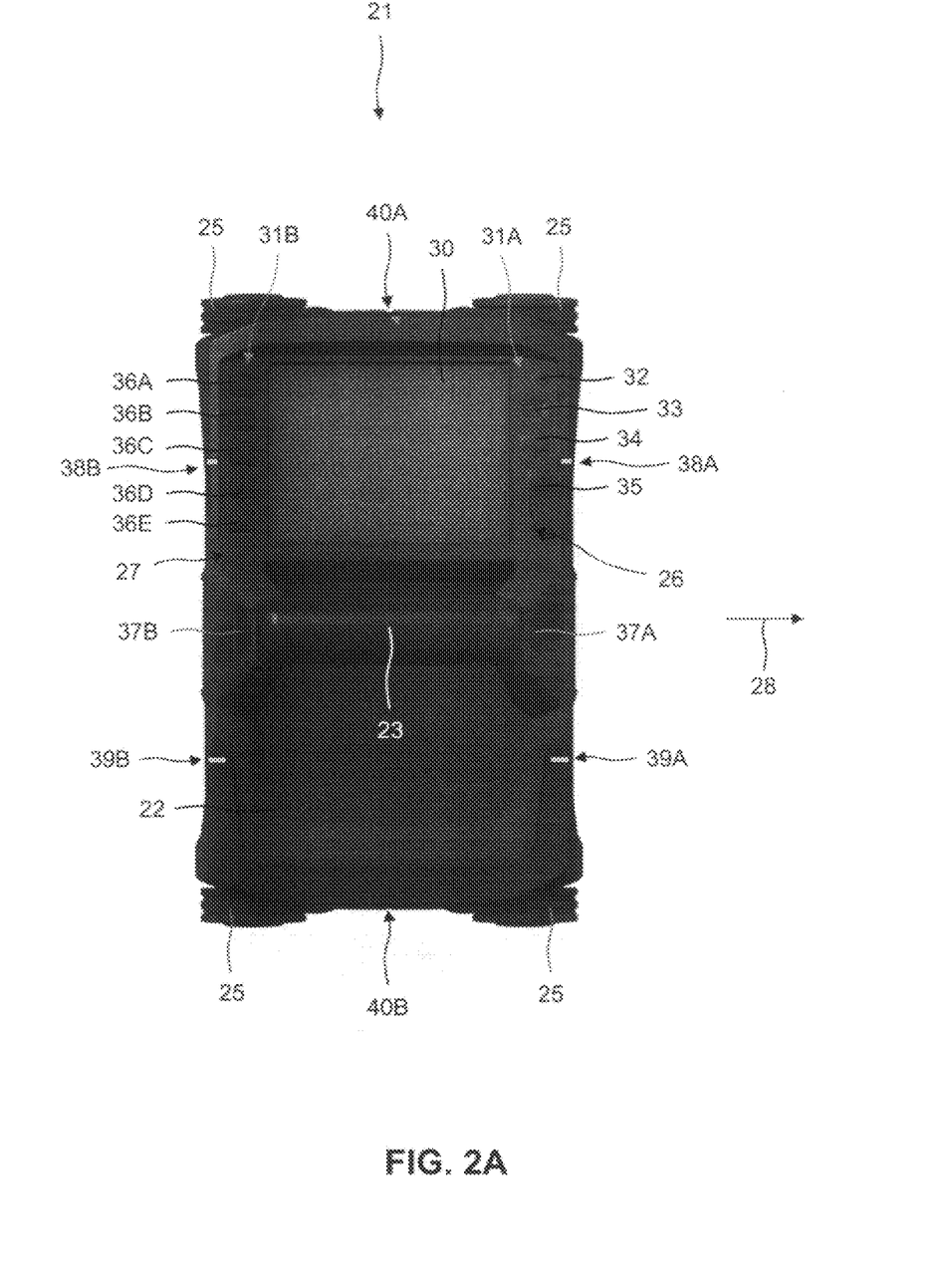
FIGS. 2A and 2B illustrates a first embodiment of a hand-operated detecting device according to the invention in a view of the upper side of the detecting device facing away from the substrate to be detected (FIG. 2A) and a measuring device arranged in the interior having a first sensor unit and a second sensor unit in a view of the underside of the detecting device facing the substrate to be detected (FIG. 2B)

FIG. 2A shows a first embodiment of a hand-operated detecting device 21, which includes a housing 22, a hand grip 23, a motion unit 24 with four wheels 25, a display unit 26 and a control panel 27.

The user guides the detecting device 21 with the aid of the hand grip 23 and the motion unit 24 in a feed direction 28 over a to-be-detected substrate, which is configured for example as a floor 3 or a rear wall 6. The hand grip 23 is arranged on an upper side 29 of the detecting device 21 which faces away from the substrate 3, 6 during a measurement and is connected to the housing 22. The display unit 26 includes a display 30 on which the measuring results of the detecting device 21 are displayed as a measurement image.

The control panel 27 is used to start a measurement and adjust the detecting device 21. The control panel 27 is made up of a first and a second control panel 31A, 31B, which are arranged on the upper side 29 next to the display 30. The first control panel 31A includes an on/off button 32 to turn the detecting device 21 on and off, a rocker switch 33, which may be used to position and move a marking line or a marking cross in a depiction on the display 30 and two additional operating buttons 34, 35. The second control panel 31B includes five function keys 36A-36E to activate different functions of a function menu, which is depicted on the display 30. The control panel 27 also includes two start/stop buttons 37A, 37B, which are used to start and stop a measurement and are arranged on the hand grip 23.

The detection field of the detecting device 21 is limited and does not coincide with the full length of the housing 22. The limits of the detection field are indicated on the right edge of the housing 22 by an upper and lower right marking 38A, 39A and on the left edge of the housing edge by an upper and lower left marking 38B, 39B. The markings make it possible for the operator to place the detecting device 21 on the substrate to be detected. The center of the detection field is indicated on the upper and lower housing edge by an upper and lower marking 40A, 40B.

Figure 2B:
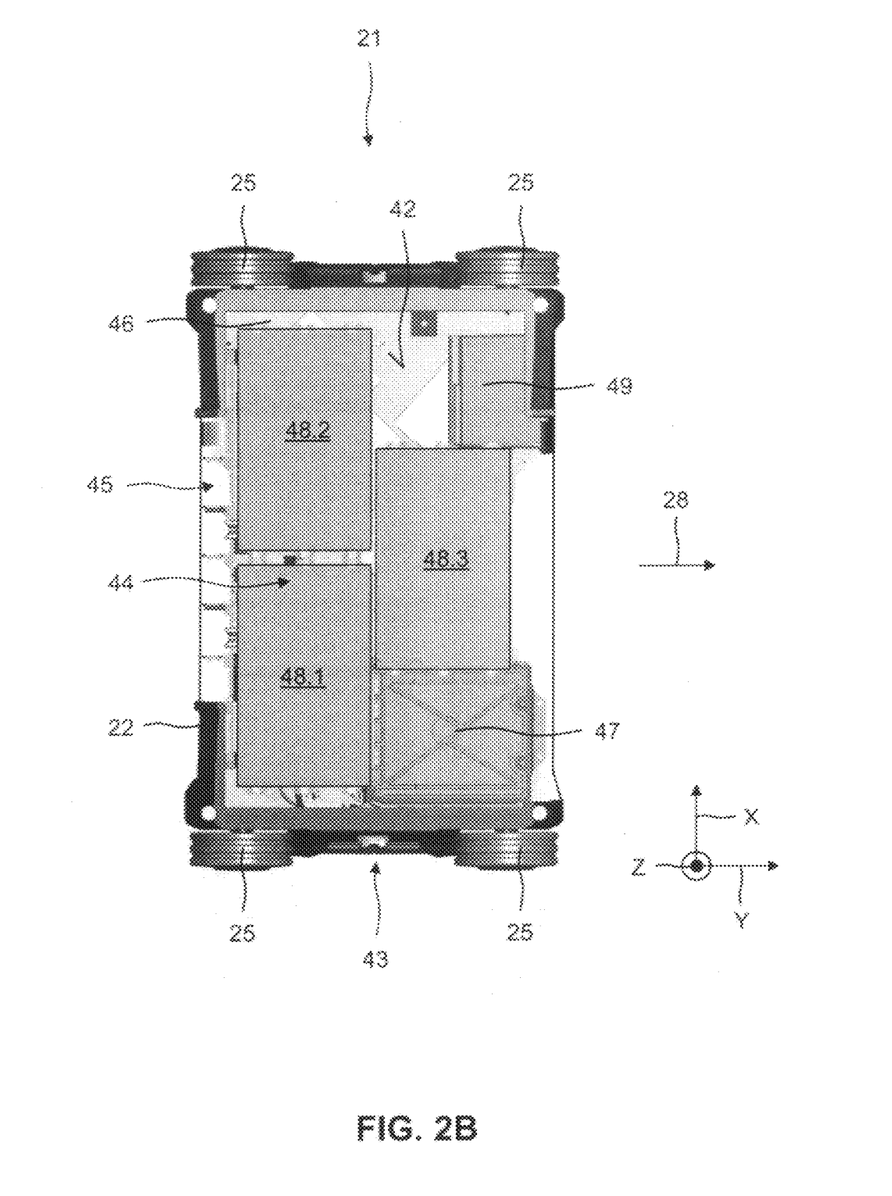

FIG. 2B shows the detecting device 21 in a view of the underside 42 that faces the substrate 3, 6 during a measurement. A measuring device 43 is located on the underside 42 inside the housing 22. The measuring device 43 includes a first sensor unit 44, a second sensor unit 45, a control and evaluation unit 46 and a voltage source 47.

The control and evaluation unit 46 is used to control the first and second sensor units 44, 45, to evaluate the receive signal received by the sensor units 44, 45 and to output a measuring result in the form of a measurement image on the display unit 26. The control and evaluation unit 46 is connected to the first and second sensor units 44, 45 via real-time communication connections and to the display unit 26 via a further real-time communication connection. The voltage source 47 is connected to the first sensor unit 44, the second sensor unit 45, the control and evaluation unit 46 and the display unit 26 and provides the units 44, 45, 46, 26 with the electrical power required for the measuring operation.

The first sensor unit 44 has a first sensor element 48.1, a second sensor element 48.2 and a third sensor element 48.3. The sensor elements 48.1-48.3 are designed as inductive sensors, capacitive sensors, radar sensors, magnetic field sensors or other sensors suitable for detecting objects in substrates.

The sensor elements 48.1-48.3 are arranged in a nested manner in a first and a second row in a horizontal plane parallel to the underside of the housing 22. The horizontal plane is spanned from a first and second horizontal direction X, Y, wherein the Y-direction runs parallel to the feed direction 28. The direction in the substrate that is perpendicular to the horizontal X and Y-directions is defined as the Z-direction. A nested arrangement is an arrangement of the sensor elements 48.1-48.3 in which the sensor elements are not arranged regularly in rows and columns, but the sensor elements are arranged in a row or column in the space between the previous and subsequent row or column. The first and second sensor elements 48.1, 48.2 are arranged in the first row, and the third sensor element 48.3 is arranged in the second row in the space between the first and second sensor element 48.1, 48.2.

During measurement, the detecting device 21 is moved over the substrate being detected in the feed direction 28 at the feed rate. The measuring device 43 also includes a coordinate acquisition unit 49 which is used to acquire the coordinates in the feed direction 28. In the case of a guided detecting device, which is able to execute any desired feed movement, the coordinates in the plane parallel to the underside of the housing 22 are acquired by the coordinate acquisition unit.

A measurement is made up of a measuring step, which is repeated with a repetition frequency of 50-5,000 Hz. The measuring step is made up of partial measuring steps: In a first partial measuring step, the first sensor element 48.1 transmits a first transmission signal $TX_1$ and the three sensor elements 48.1-48.3 each receive a receive signal $TX_1/RX_1$, $TX_1/RX_2$, $TX_1/RX_3$. In a second partial measuring step, the second sensor element 48.2 transmits a second transmission signal $TX_2$ and the three sensor elements 48.1-48.3 each receive a receive signal $TX_2/RX_1$, $TX_2/RX_2$, $TX_2/RX_3$. In a third partial measuring step, the third sensor element 48.3 transmits a third transmission signal $TX_3$ and the three sensor elements 48.1-48.3 each receive a receive signal $TX_3/RX_1$, $TX_3/RX_2$, $TX_3/RX_3$. The sensor elements 48.1-48.3 are controlled via the control and evaluation unit 46 in such a way that in transmission mode always only one sensor element transmits a transmission signal and in receive mode all sensor elements 48.1-48.3 receive a receive signal. With three sensor elements 48.1, 48.2, 48.3 each transmitting a transmission signal $TX_1$, $TX_2$, $TX_3$ the result is nine receive signals.

Figure 3A:
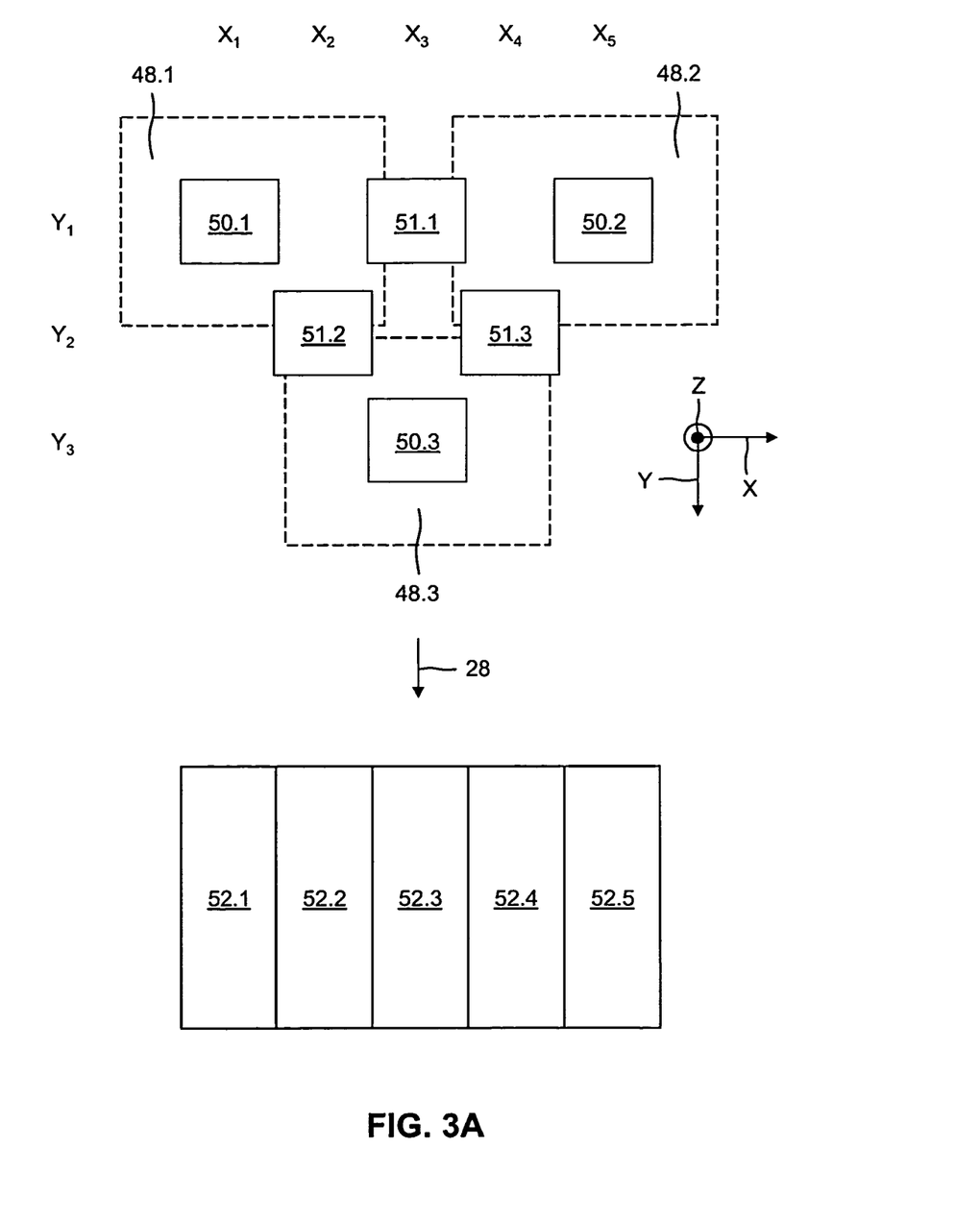
FIGS. 3A and 3B are schematic representations of the first sensor unit from FIG. 2B with three sensor elements (FIG. 3A) and the second sensor unit from FIG. 2B designed as a current sensor unit, which has four first magnetic field sensor elements and three second magnetic field sensor elements, which measure a magnetic field gradient in two different directions (FIG. 3B)

FIG. 3A shows a schematic representation of the first sensor unit 44 with the three sensor elements 48.1, 48.2, 48.3, which explains the spatial allocation of the nine receive signals $TX_i/RX_j$, with i, j=1, 2, 3.

The nine receive signals $TX_i/RX_j$, with i, j=1, 2, 3 include three monostatic receive signals $TX_i/RX_i$, with i=1, 2, 3 and six bistatic receive signals $TX_i/RX_j$, with i, j=1, 2, 3 and i≠j, wherein monostatic designates a mode where a sensor element transmits and simultaneously receives, and bistatic designates a mode where a sensor element transmits and another sensor element receives. The nine receive signals are allocated to six limited surface areas in the XY plane. A monostatic surface area 50.1, 50.2, 50.3 is allocated to each sensor element 48.1, 48.2, 48.3. The monostatic receive signals $TX_i/X_i$, with i=1, 2, 3 are allocated to the monostatic surface areas 50.1, 50.2, 50.3. The monostatic surface areas 50.1, 50.2 and 50.3 have the coordinates $X_1/Y_1$, $X_5/Y_1$ and $X_3/Y_3$ in the XY plane.

FIG. 3A shows three further limited surface areas 51.1, 51.2, 51.3, which are designated as bistatic surface areas. The bistatic receive signals $TX_1/RX_2$ and $TX_2/RX_1$ are averaged and the averaged signal is allocated to the bistatic surface area 51.1. The bistatic surface area 51.1 is arranged between the first and second monostatic surface areas 50.1 and 50.2 and has the coordinates $X_3/Y_1$ in the XY plane. The bistatic receive signals $TX_1/RX_3$ and $TX_3/RX_1$ are averaged and the averaged signal is allocated to the surface area 51.2. The bistatic surface area 51.2 is arranged between the first and third monostatic surface areas 50.1 and 50.3 and has the coordinates $X_2/Y_2$ in the XY plane. The bistatic receive signals $TX_2/RX_3$ and $TX_3/RX_2$ are averaged and the averaged signal is allocated to the surface area 51.3. The bistatic surface area 51.3 is arranged between the second and third monostatic surface areas 50.2 and 50.3 and has the coordinates $X_4/Y_2$ in the XY plane. In addition to averaging, a median, a maximum value or a weighted sum, for example, may be calculated from the bistatic receive signals. The term "averaged signal" is understood as a signal, which is calculated from the bistatic receive signals using a suitable mathematical function such as mean value, median, maximum value or weighted sum.

The six surface areas 50.1-50.3, 51.1-51.3, which are moved at a feed rate along the feed direction 28, form five receive channels 52.1, 52.2, 52.3, 52.4, 52.5, which are defined by a center point and a width. The center points of the receive channels 52.1-52.5 correspond to the X-coordinates $X_1$, $X_2$, $X_3$, $X_4$, $X_5$ and the width of the receive channels 52.1-52.5 corresponds to the width of the surface areas. The Y-coordinates change due to the feed movement of the detecting device 21 in the feed direction 28. The coordinate acquisition unit 49 acquires the Y-coordinates of the surface areas 50.1-50.3, 51.1-51.3 or acquires a reference coordinate, which is arranged at a known distance from the surface areas 50.1-50.3, 51.1-51.3.

During the feed movement, the receive signals are acquired and a portion of a depth cross-sectional image is already calculated from the acquired receive signals. This portion of the depth cross-sectional image is transmitted to the display unit 26 via the real-time communication connection of the control and evaluation unit 46. The depth cross-sectional image is updated regularly during the feed movement. The receive channels 52.1-52.5 form the tracks in which the receive signals are displayed and regularly updated.

Figure 3B:
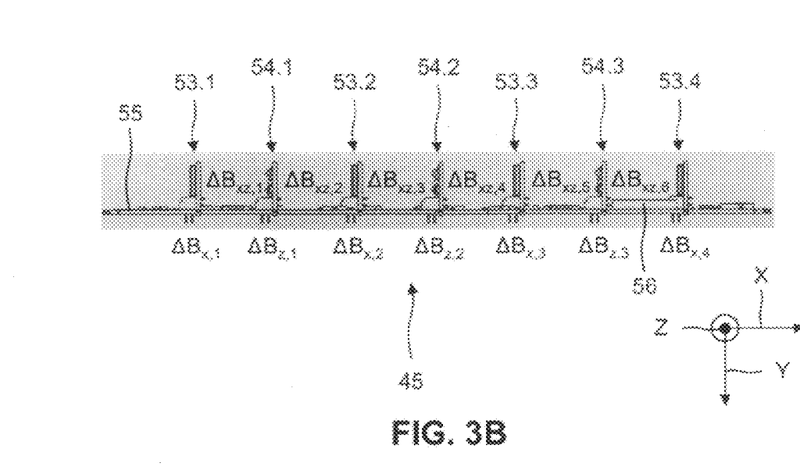

FIG. 3B shows an enlarged representation of the second sensor unit 45 of the detecting device 21. The second sensor unit 45 is designed as a current sensor unit to detect a power line and includes four first magnetic field sensor elements 53.1, 53.2, 53.3, 53.4 and three second magnetic field sensor elements 54.1, 54.2, 54.3, which are arranged in an alternating manner on a circuit board 55. The circuit board 55 serves as a retaining element to mechanically fasten and electrically connect the first and second magnetic field sensor elements 53.1-53.4, 54.1-54.3. A connecting element 56 is located on the circuit board 55, which connects the circuit board 55 to the control and evaluation unit 46.

The first magnetic field sensor elements 53.1-53.4 measure a first magnetic field gradient $\Delta B_X$ in the first horizontal direction X and the second magnetic field sensor elements 54.1-54.3 measure a second magnetic field gradient $\Delta B_Z$ in the depth direction Z. In order to eliminate a homogeneous magnetic DC field during detection, the first and second magnetic field sensor elements 53.1-53.4, 54.1-54.3 are designed as gradient sensor elements and calculate a differential value $\Delta B_X$, $\Delta B_Z$. An average value $\Delta B_{XZ}=\text{sqrt}[(\Delta B_X)^2+(\Delta B_Z)^2]$ is calculated from the differential values $\Delta B_X$, $\Delta B_Z$ of adjacent first and second magnetic field sensor elements. The current sensor unit 45 shown in FIG. 3B with four first magnetic field sensor elements 53.1-53.4 and three second magnetic field sensor elements 54.1-54.3 supplies six measured values $\Delta B_{XZ,1}$-$\Delta B_{XZ,6}$, which are allocated to six different X-coordinates along the first horizontal direction X. The control and evaluation unit 46 is able to determine the progression of the power line in the substrate from the measured values $\Delta B_{XZ,1}$-$\Delta B_{XZ,6}$ and transmit it to the display unit 26 as a horizontal representation (XY representation) of the substrate with the power line.

Figure 4:
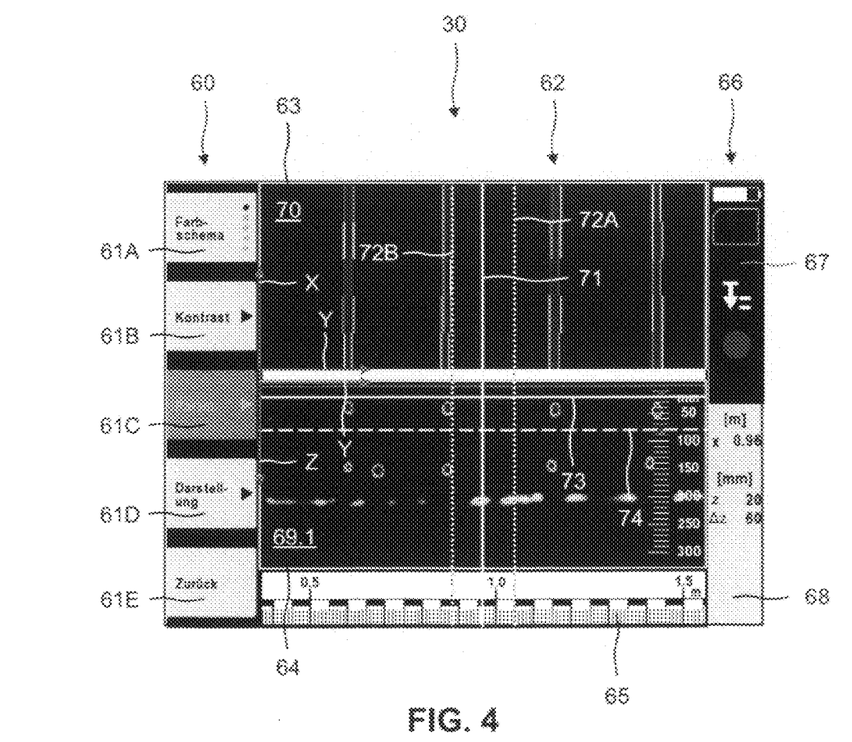
FIG. 4 is a measurement image of the detecting device in FIGS. 2A and 2B, which is moved over the to-be-detected substrate in a feed direction in a first operating mode, with a plan view and a depth cross-sectional image.

FIG. 4 shows the display 30 of the display unit 26 with a measurement image from the detecting device 21 in a first operating mode in which the detecting device 21 is moved over the substrate in a linear feed movement along the feed direction 28. In the first operating mode, the width of the measurement image in the X-direction is limited to the width of the detection field. The width of the detection field is indicated to the operator by the upper and lower markings 38A, 38B, 39A, 39B on the housing 22 of the detecting device 21. The resolution in the X-direction is determined by the number of receive channels 52.1-52.5.

The detecting device 21 has a first sensor unit 44 and a second sensor unit 45. The operator is able to set whether the measurement should be executed with the first sensor unit 44, the second sensor unit 45 or the first and second sensor units 44, 45. FIG. 4 shows a measurement image that was recorded with the first sensor unit 44.

When a measurement image is being displayed in the first operating mode, the display 30 is subdivided into three main fields: A function menu containing up to five functions 61A-61E is shown in on the left edge of the display 30 in a first main field 60. Each function 61A-61E is activated by the left function keys 36A-36E on the second control panel 31B. A second main field 62 is arranged in the center area of the display 30 and is used to display the measurement image. The second main field 62 is subdivided in the first operating mode into three sub-areas, which are arranged one below the other: A plan view is shown in an upper sub-area 63, a depth cross-sectional image in the center sub-area 64 and an associated measuring scale in a lower sub-area 65. Various information for the operator is shown on the right edge of the display 30 in a third main field 66. The third main field 66 is subdivided into an upper status area 67 and a lower information area 68. The status area 67 contains, among other things, information about the charge status of the voltage source 46 or a memory card, wherein the information in the status area 67 is displayed in the form of pictograms. The current coordinates of the measurement image are displayed in the information area 68.

A depth cross-sectional image is a two-dimensional representation of the measuring results in a plane running perpendicular to the XY plane; the depth direction is plotted on the vertical axis of the depth cross-section image and a horizontal direction in the XY plane is plotted on the horizontal axis. With a linear feed movement, the horizontal direction corresponds in particular to the feed direction; with a held detecting device or the movement of a guided detecting device along any desired path, the horizontal direction corresponds in particular to a preferred direction determined by the detecting device, for example a housing edge. Raw data, i.e., receive signals configured as hyperbolas, or receive signals that have been further processed, are displayed in the depth cross-sectional image. The receive signals are processed by means of image processing and pattern recognition methods in order to obtain information about the objects in the substrate. In depth cross-sectional images that use further-processed receive signals, the objects are depicted geometrically as objects; the shape and size of the objects is indicated by different colors.

A plan view is a two-dimensional representation of the measuring results in the XY plane, which is calculated from the depth cross-sectional images as a mean value, median, maximum value or weighted sum or other suitable mathematical function over a depth range between a first and second depth. In doing so, the depth range is determined by the first and second depths or by a layer depth and a layer thickness. The depth range over which the plan view is averaged is designed to be adjustable via the rocker switch 33 on the first control panel 31A. Only those objects that are within the set depth range are displayed in the plan view. All other objects that are outside the set depth range are not displayed in the plan view.

The center sub-area 64 shows a first depth cross-sectional image 69.1 of the receive channel 52.1 in which the objects in the substrate are identified by pattern recognition; the iron grid 8 is shown in cross-section. The depth cross-sectional image is spanned from the depth direction Z as a vertical axis and the feed direction 28 as the horizontal axis. In addition to the first depth cross-sectional image 69.1 of the first receive channel 52.1, additional depth cross-sectional images 69.2-69.5 are stored for the other receive channels 52.2-52.5. The transition between the depth cross-sectional images 69.1-69.5 remains unprocessed or is interpolated using known interpolation methods. The operator is able to switch back and forth between the depth cross-sectional images 69.1-69.5 by means of the rocker switch 33.

The upper sub-area 63 shows a plan view 70, which was calculated from the depth cross-sectional images 69.1-69.5 over a depth range between a first depth z and a second depth $z+\Delta z$. The grid rods in the iron grid 8 were recognized via a pattern recognition method in the averaged receive signals and displayed as grid rods in the plan view 70. The operator is able to select between several color schemes for the color representation of the depth cross-sectional images 69.1-69.5 and the plan view 70. The color schemes are used to vary the representation and to adjust to the ambient brightness and have no further function.

Several vertical and horizontal marking lines, which are partially movable via the rocker switch 33, are arranged in the second main field 62 of the display 30. The rocker switch 33 is adjustable between different settings via the function menu; the current setting of the rocker switch 33 is indicated in the status area 67. In a first setting, the layer depth z and the layer thickness $\Delta z$ of the depth range is adjustable via the rocker switch 33. FIG. 4 shows a solid, vertical marking line 71, two dotted, vertical marking lines 72A, 72B along with a solid and a dashed horizontal marking line 73, 74. The solid, vertical marking line 71 identifies the center of the detection field and corresponds to the position of markings 40A, 40B on the upper and lower edge of the housing 22. The dotted, vertical marking line 72A indicates the right housing edge and the dotted, vertical marking line 72B indicates the left housing edge of the housing 22 of the detecting device 21. The solid, horizontal marking line 73 determines the layer depth z and the dashed, horizontal marking line 74 determines the layer thickness $\Delta z$ of the depth range. The current position information for the center of the detection field (x), the layer depth (z) and the layer thickness ($\Delta z$) is indicated in the information area 68. The plan view depicted in FIG. 4 is averaged over a depth range of 20 mm to 80 mm, the layer depth z is 20 mm and the layer thickness $\Delta z$ is 60 mm. The center of the detection field is located at X-coordinate 0.96 m.

When the operator executes the measurement with the first and second sensor units 44, 45, he/she is able to select between different display modes. In a first display mode, the control and evaluation unit 46 calculates separate depth cross-sectional images and plan views from the receive signals of the first and second sensor units 44, 45, which images and views are displayed simultaneously or in succession on the display unit 26. In a second display mode, the control and evaluation unit 46 calculates common depth cross-sectional images and a common plan view from the receive signals of the first and second sensor units 44, 45.

Figure 5A:
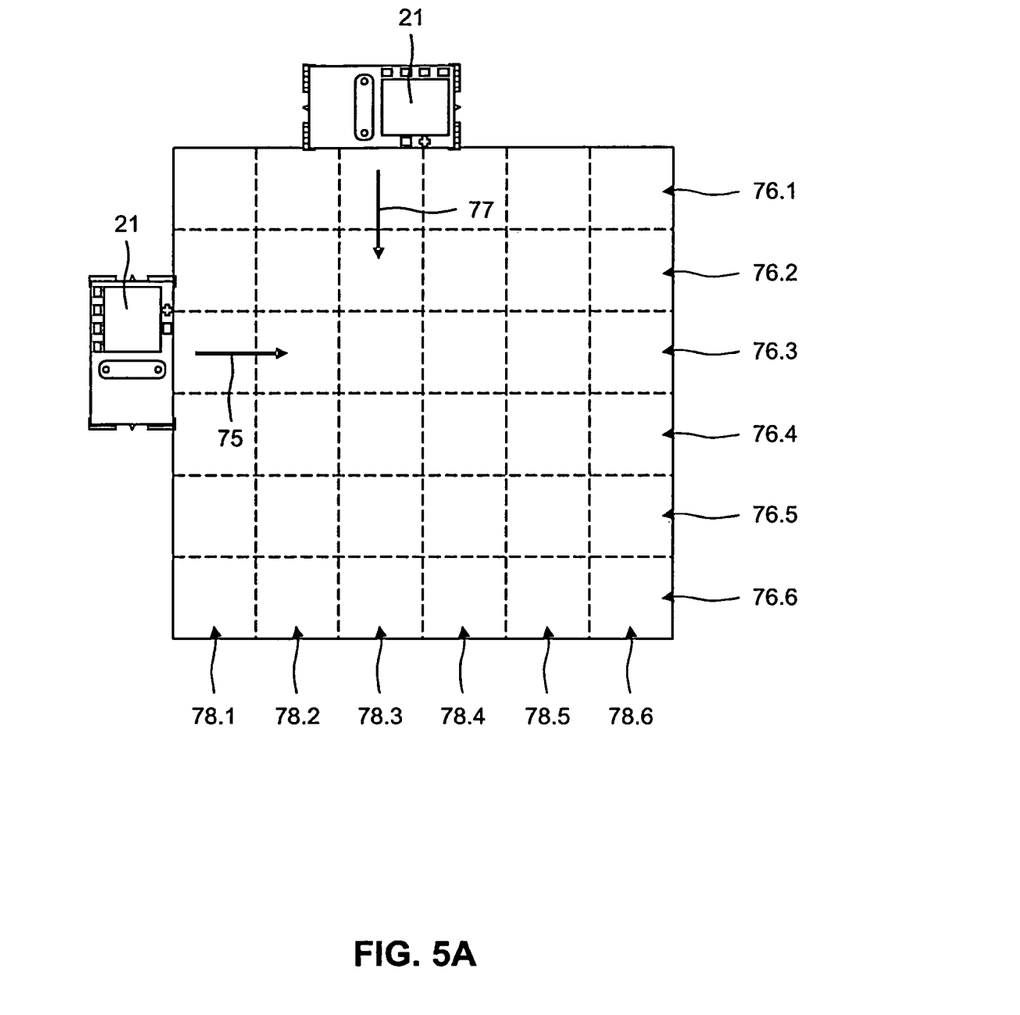
FIGS. 5A and 5B illustrate the detecting device from FIGS. 2A and 2B, which is moved over the to-be-detected substrate in parallel measuring tracks in two perpendicular feed directions in a second operating mode (FIG. 5A) and a measurement image of the detecting device in the second operating mode with a plan view and two depth cross-sectional images (FIG. 5B)
Figure 5B:
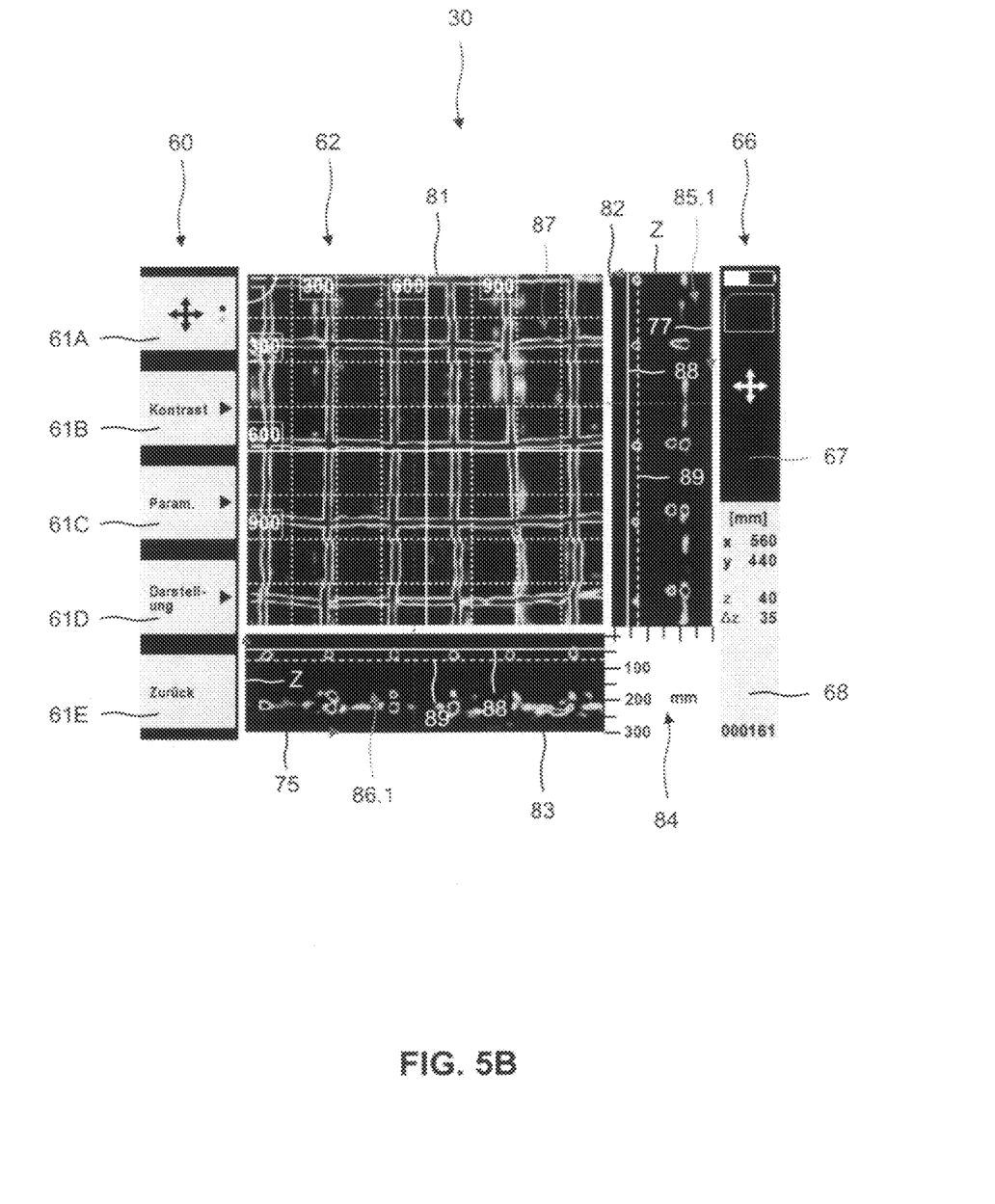

FIGS. 5A, B show the detecting device 21 in a second operating mode, in which the detecting device 21 is moved over the substrate in two perpendicular feed directions in several parallel measuring tracks. The measuring results of the individual measuring tracks are automatically merged to obtain one measurement image for a larger surface area.

FIG. 5A schematically shows the arrangement of the measuring tracks on the substrate. In order to align the measuring tracks as precisely as possible with one another, a measuring grid is glued to the substrate or the measuring grid is drawn directly on the substrate. The detecting device 21 is moved over the substrate in a first feed direction 75 in several parallel measuring tracks 76.1-76.6. Then the detecting device 21 is moved over the substrate in a second feed direction 77, which runs perpendicular to the first feed direction 75, in several parallel measuring tracks 78.1-78.6.

FIG. 5B shows the display 30 of the detecting device 21 with a measurement image that was generated in the second operating mode. It is also possible to display the measurement image in different ways during and after the measurement with the aid of various display parameters. The second main field 62 of the display 30 is subdivided in the second operating mode of the detecting device 21 into four sub-areas, which are arranged in the shape of rectangles. A plan view is shown in an upper left sub-area 81, a first depth cross-sectional image in an upper right sub-area 82, a second depth cross-sectional image in a lower left sub-area 83 and an associated measuring scale for the first and second depth cross-sectional images in a lower right sub-area 84.

The first depth cross-sectional image in the upper right sub-area 82 shows a depth cross-sectional image 85.1, which spans from the depth direction Z and the second feed direction 77. Additional depth cross-sectional images 85.2-85.30 are stored perpendicular to the second feed direction 77, i.e., in the direction of the first feed direction 75; six parallel measuring tracks 76.1-76.6 and five receive channels per measuring track produce 30 depth cross-sectional images. The second depth cross-sectional image in the lower left sub-area 83 shows a depth cross-sectional image 86.1, which spans from the depth direction Z and the first feed direction 75. Additional depth cross-sectional images 86.2-86.30 are stored perpendicular to the first feed direction 75, i.e., in the direction of the second feed direction 77; six parallel measuring tracks 78.1-78.6 and five receive channels per measuring track produce 30 depth cross-sectional images. The upper left sub-area 81 shows a plan view 87, which was calculated from the first and/or second depth cross-sectional images between the first depth z and the second depth z+Δz. The plan view 87 depicted in FIG. 5B is averaged over a depth range of 40 mm to 75 mm, the layer depth z is 40 mm and the layer thickness Δz is 35 mm.

Arranged in the depth cross-sectional images 85.1, 86.1 are a solid marking line 88 and a dashed marking line 89, which are movable via the rocker switch 33. The solid marking line 88 determines the layer depth z and the dashed marking line 89 determines the layer thickness Δz of the depth range. The current position information for the crosshairs (rocker switch) and for the depth cross-sectional images in the X and Y-directions (x, y), the layer depth (z) and the layer thickness (Δz) is displayed in the information area 68.

Figure 6A:
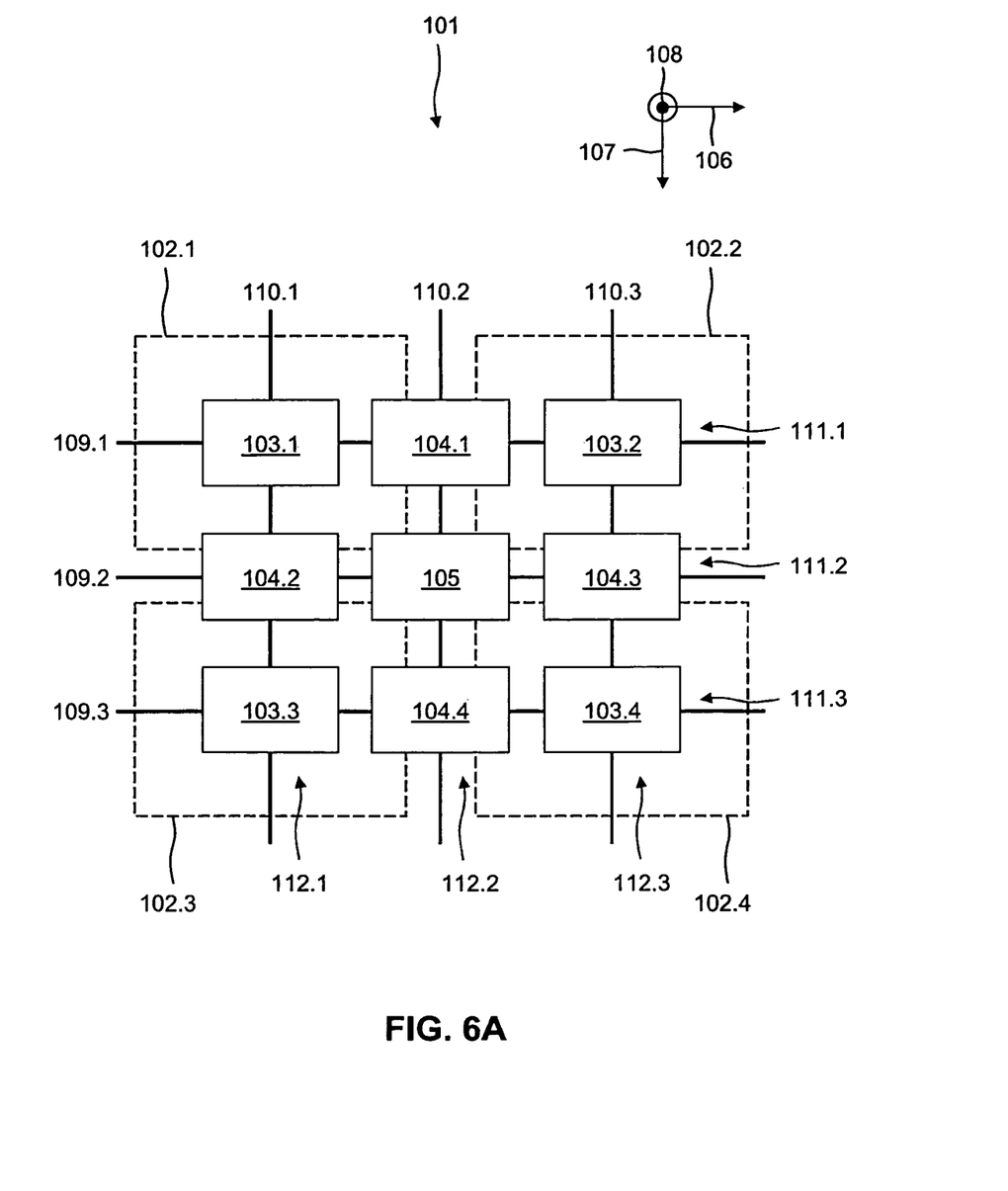
FIGS. 6A and 6B illustrate a first embodiment of a sensor unit for a held detecting device having four sensor elements, which are arranged regularly in rows and columns (FIG. 6A), and a second embodiment having five sensor elements in a nested arrangement (FIG. 6B).

FIG. 6A shows a first embodiment of a sensor unit 101 with four sensor elements 102.1-102.4, which are arranged regularly in two rows and two columns. Each sensor element 102.1-102.4 functions as a transmission element in transmission mode and as a sensor element in receive mode. If, as described, the four sensor elements 102.1-102.4 are controlled by the control and evaluation unit 46 such that respectively one sensor element transmits and all sensor elements receive, and this process is carried out for all sensor elements, a receive field with nine receive areas is produced.

The nine receive areas can be divided into three categories of receive areas. Every sensor element 102.1-102.4 is directly allocated a monostatic receive area 103.1-103.4, which respectively displays the monostatic receive signal; four monostatic receive areas 103.1-103.4 are yielded. Located between two sensor elements that are adjacent in a row or a column is a respective receive area 104.1-104.4 in which an averaged signal of the two bistatic receive signals is displayed; with four sensor elements 102.1-102.4, four receive areas 104.1-104.4 are yielded in this way. One further receive area 105 is yielded between four sensor elements arranged in a rectangular manner in relation to one another in the area of the mid-point, in which an averaged signal of the four bistatic receive signals is displayed; with four sensor elements 102.1-102.4, one additional receive area 105 is produced in this manner.

The sensor unit 101 is suitable for use in a held detecting device. The sensor elements 102.1-102.4 are arranged in perpendicular rows and columns along a first horizontal direction 106 and along a second horizontal direction 107; the direction in the substrate perpendicular to the horizontal directions 106, 107 is defined as the depth direction 108. Depth cross-sectional images, which are depicted schematically in FIG. 6A, are calculated from the monostatic and bistatic receive signals in the first and second directions 106, 107. In addition to the depth cross-sectional images, a plan view is calculated, which is calculated from the depth cross-sectional images in the first and/or second direction 106, 107 or directly from the nine receive areas over a depth range between a first and second depth.

The depth cross-sectional images in the first horizontal direction 106 are spanned from depth direction 108 as the vertical axis and the first horizontal direction 106 as the horizontal axis. In the first horizontal direction 106, a first horizontal depth cross-sectional image 109.1 is calculated from the three receive areas 103.1, 104.1, 103.2, a second horizontal depth cross-sectional image 109.2 from the three receive areas 104.2, 105, 104.3 and a third horizontal depth cross-sectional image 109.3 from the three receive areas 103.3, 104.4, 103.4. The depth cross-sectional images in the second horizontal direction 107 are spanned from the depth direction 108 as the vertical axis and the second horizontal direction 107 as the horizontal axis. In the second horizontal direction 107, first vertical depth cross-sectional image 110.1 is calculated from the three receive areas 103.1, 104.2, 103.3, a second vertical depth cross-sectional image 110.2 from the three receive areas 104.1, 105, 104.4 and a third vertical depth cross-sectional image 110.3 from the three receive areas 103.2, 104.3, 103.4.

The three receive areas 103.1, 104.1, 103.2 form a first horizontal receive channel 111.1, the three receive areas 104.2, 105, 104.3 form a second horizontal receive channel 111.2 and the three receive areas 103.3, 104.4, 103.4 form a third horizontal receive channel 111.3. The three receive areas 103.1, 104.2, 103.3 form a first vertical receive channel 112.1, the three receive areas 104.1, 105, 104.4 form a second vertical receive channel 112.2 and the three receive areas 103.2, 104.3, 103.4 form a third vertical receive channel 112.3.

Figure 6B:
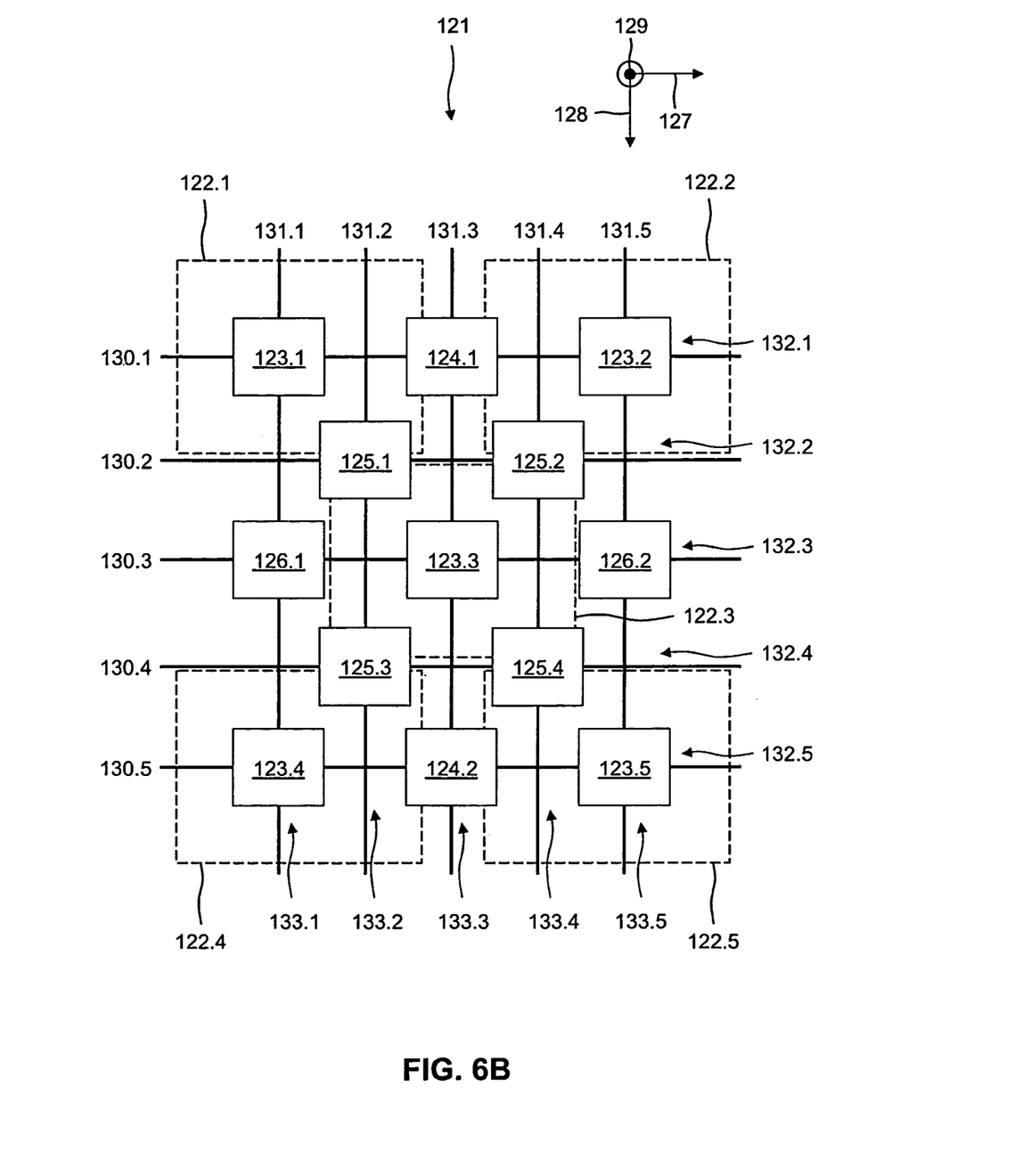

FIG. 6B shows a second embodiment of a sensor unit 121 with five sensor elements 122.1-122.5 in a nested arrangement. Each sensor element 122.1-122.5 functions as a transmission element in transmission mode and as a receive element in receive mode. The five sensor elements 122.1-122.5 yield a receive field with 13 receive areas.

The receive areas can be divided into four categories of receive areas. Every sensor element 122.1-122.5 is allocated a monostatic receive area 123.1-123.5, which displays the respective monostatic receive signal; five monostatic receive areas 123.1-123.5 are yielded. Located between two adjacent sensor elements in a row is a respective receive area 124.1, 124.2, in which an averaged signal of the two bistatic receive signals is displayed; with five sensor elements 122.1-122.5, two receive areas 124.1, 124.2 are yielded in this manner. Located between two diagonally arranged sensor elements is a respective receive area 125.1-125.4, in which an averaged signal of the two bistatic receive signals is displayed; with five sensor elements 122.1-122.5, four receive areas 125.1-125.4 are yielded in this manner. Located between two sensor elements, which are arranged in rows with the same arrangement, are a respective receive area 126.1, 126.2, in which an averaged signal of the two bistatic receive signals is displayed; with five sensor elements 122.1-122.5, two receive areas 126.1, 126.2 are yielded in this manner.

The sensor unit 121 is suitable among other things for use in a held detecting device. The sensor elements 122.1-122.5 are arranged along a first horizontal direction 127 and along a second horizontal direction 128; the direction in the substrate perpendicular to the horizontal directions 127, 128 is defined as the depth direction 129. Depth cross-sectional images, which are depicted schematically in FIG. 6B, can be calculated from the receive signals in the first and second horizontal direction 127, 128. In addition to the depth cross-sectional images, a plan view is calculated, which is calculated from the depth cross-sectional images in the first and/or second horizontal direction 127, 128 or directly from the nine receive areas over a depth range between a first and second depth.

The depth cross-sectional images in the first horizontal direction 127 are spanned from the depth direction 129 as the vertical axis and the first horizontal direction 127 as the horizontal axis. In the first horizontal direction 127, a first depth cross-sectional image 130.1 is calculated from the three receive areas 123.1, 124.1, 123.2, a second depth cross-sectional image 130.2 from the two receive areas 125.1, 125.2, a third depth cross-sectional image 130.3 from the three receive areas 126.1, 123.3, 126.2, a fourth depth cross-sectional image 130.4 from the two receive areas 125.3, 125.4 and a fifth depth cross-sectional image 130.5 from the three receive areas 123.4, 124.2, 123.5. The depth cross-sectional images in the second horizontal direction 128 are spanned from the depth direction 129 as the vertical axis and the second horizontal direction 128 as the horizontal axis. In the second horizontal direction 128, a first depth cross-sectional image 131.1 is calculated from the three receive areas 123.1, 126.1, 123.4, a second depth cross-sectional image 131.2 from the two receive areas 125.1, 125.3, a third depth cross-sectional image 131.3 from the three receive areas 124.1, 123.3, 124.2, a fourth depth cross-sectional image 131.4 from the two receive areas 125.2, 125.4 and a fifth depth cross-sectional image 131.5 from the three receive areas 123.2, 126.2, 123.5.

The three receive areas 123.1, 124.1, 123.2 form a first horizontal receive channel 132.1, the two receive areas 125.1, 125.2 form a second horizontal receive channel 132.2, the three receive areas 126.1, 123.3, 126.2 form a third horizontal receive channel 132.3, the two receive areas 125.3, 125.4 form a fourth horizontal receive channel 132.4 and the three receive areas 123.3, 124.2, 123.5 form a fifth horizontal receive channel 132.5. The three receive areas 123.1, 126.1, 123.4 form a first vertical receive channel 133.1, the two receive areas 125.1, 125.3 form a second vertical receive channel 133.2, the three receive areas 124.1, 123.3, 124.2 form a third vertical receive channel 133.3, the two receive areas 125.2, 125.4 form a fourth vertical receive channel 133.4 and the three receive areas 123.2, 126.2, 123.5 form a fifth vertical receive channel 133.5.

The sensor units 101, 121 may also be used in a guided detecting device in addition to a held detecting device. In the case of a guided detecting device, which is moved along any desired path, two perpendicular directions are defined in the XY plane by the device manufacturer, for example directions that are preferred because of the arrangements of the sensor elements. The receive signals acquired by the sensor elements are allocated in the XY plane to the X and Y-coordinates acquired by a coordinate acquisition unit. The depth cross-sectional images are calculated along the two perpendicular directions. A plan view is calculated from the depth cross-sectional images or directly from the receive signals and is displayed on the display unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting an object in a substrate, comprising the steps of:
    transmitting a transmission signal by a first sensor element of a sensor unit;
    receiving a first receive signal by the first sensor element of the sensor unit;
    simultaneously with receiving the first receive signal, receiving a second receive signal by a second sensor element of the sensor unit;
    simultaneously calculating a first depth cross-sectional image from the first receive signal and a second depth cross-sectional image from the second receive signal by a control and evaluation unit; and
    displaying at least one of the first depth cross-sectional image and the second depth cross-sectional image on a display unit.

2. The method according to claim 1, further comprising the step of calculating a plan view from the first and the second depth cross-sectional images and displaying the plan view on the display unit, wherein the plan view is calculated over a depth range between a first depth and a second depth.

3. The method according to claim 2, further comprising the step of depicting only objects that exceed a threshold value in the plan view.

4. The method according to claim 2, further comprising the step of interpolating the first and the second depth cross-sectional images.

5. The method according to claim 1, further comprising the steps of:
    moving the sensor unit over the substrate in a first feed direction and a second feed direction in parallel measuring tracks; and
    calculating several depth cross-sectional images from receive signals in the first and the second feed directions.

6. The method according to claim 5, further comprising the steps of:
    calculating a plan view from the depth cross-sectional images calculated in the first feed direction and from the depth cross-sectional images calculated in the second feed direction; and
    displaying the plan view on the display unit.

7. The method according to claim 1, further comprising the step of receiving a third receive signal by a third sensor element of a second sensor unit.

8. The method according to claim 7, further comprising the steps of:
    calculating depth cross-sectional images from the first receive signal of the sensor unit and the third receive signal of the third sensor element and depth cross-sectional images from the second receive signal of the sensor unit and the third receive signal of the third sensor element by the control and evaluation unit; and calculating a plan view from the depth cross-sectional images.

9. The method according to claim 7, further comprising the steps of:

calculating depth cross-sectional images from the first and second receive signals of the sensor unit and calculating depth cross-sectional images from the third receive signal of the third sensor element by the control and evaluation unit; and calculating a plan view from the depth cross-sectional images calculated from the first and second receive signals and calculating a plan view from the depth cross-sectional images calculated from the third receive signal of the third sensor element.

10. A device for detecting an object in a substrate, comprising:

a sensor unit having a first sensor element and a second sensor element, wherein a transmission signal is transmittable by the first sensor element and wherein a first receive signal is receivable at the first sensor element and a second receive signal is simultaneously receivable at the second sensor element;

a control and evaluation unit, wherein the sensor unit is controllable by the control and evaluation unit and wherein respective depth cross-sectional images are simultaneously calculatable by the control and evaluation unit from the first receive signal received at the first sensor element and from the second receive signal received at the second sensor element; and a display unit, wherein the respective depth cross-sectional images are displayable on the display unit.

11. The device according to claim 10:

wherein a plan view is calculatable by the control and evaluation unit from the respective depth cross-sectional images between a first depth and a second depth;

and wherein the plan view is displayable on the display unit.

12. The device according to claim 11, wherein the first depth and the second depth are adjustable.

13. The device according to claim 11, wherein a horizontal surface area in which the plan view is displayable is adjustable and wherein the horizontal surface area is separately adjustable in a first and a second horizontal direction.

14. The device according to claim 11, wherein at least one of the respective depth cross-sectional images and the plan view are displayable simultaneously on the display unit.

15. The device according to claim 14, wherein the at least one of the respective depth cross-sectional images is adjustable via a rocker switch, wherein a position of the rocker switch is displayable in the plan view.

16. The device according to claim 10, further comprising a second sensor unit having sensor elements, wherein the sensor elements of the second sensor unit differ in at least one sensor property from the first and the second sensor elements of the sensor unit.

17. The device according to claim 16, wherein any object is detectable by the sensor unit and wherein only a power line is detectable by the second sensor unit.

18. The device according to claim 16, wherein a measuring result of the sensor unit is displayable on the display unit in a first display mode, wherein a measuring result of the second sensor unit is displayable on the display unit in a second display mode, and wherein the measuring result of the sensor unit and the measuring result of the second sensor unit are displayable on the display unit in a third display mode.

* * * * *